(12) United States Patent
Adams

(10) Patent No.: US 8,948,246 B2
(45) Date of Patent: Feb. 3, 2015

(54) METHOD AND SYSTEM FOR SPATIAL PREDICTION IN A VIDEO ENCODER

(75) Inventor: Andrew Adams, Westford, MA (US)

(73) Assignee: Broadcom Corporation, Irvine, CA (US)

( * ) Notice: Subject to any disclaimer, the term of this patent is extended or adjusted under 35 U.S.C. 154(b) by 3097 days.

(21) Appl. No.: 11/113,335

(22) Filed: Apr. 11, 2005

(65) Prior Publication Data

US 2006/0227863 A1    Oct. 12, 2006

(51) Int. Cl.
*H04N 7/12* (2006.01)
*H04N 19/593* (2014.01)
*H04N 19/103* (2014.01)
*H04N 19/176* (2014.01)
*H04N 19/436* (2014.01)

(52) U.S. Cl.
CPC ........... *H04N 7/345* (2013.01); *H04N 7/26026* (2013.01); *H04N 7/26244* (2013.01); *H04N 7/26755* (2013.01)
USPC .................................................... 375/240.01

(58) Field of Classification Search
USPC ....................................................... 375/240.1
See application file for complete search history.

(56) References Cited

U.S. PATENT DOCUMENTS

2005/0201627 A1* 9/2005 Liang et al. ................... 382/239
2006/0013320 A1* 1/2006 Oguz et al. ............... 375/240.27

* cited by examiner

*Primary Examiner* — Richard Torrente
(74) *Attorney, Agent, or Firm* — Brinks Gilson & Lione

(57) ABSTRACT

Described herein is a method and system for spatial prediction in a video encoder. The method and system can operate on a set of video elements in parallel. Multiple modes can also be executed for each set of video elements. Modes correspond to a weighted combination of neighboring video elements. The weighted combination can be changed and loaded into a spatial predictor instruction table.

20 Claims, 4 Drawing Sheets

METHOD AND SYSTEM FOR SPATIAL PREDICTION IN A VIDEO ENCODER

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video communications systems are continually being enhanced to meet requirements such as reduced cost, reduced size, improved quality of service, and increased data rate. Many advanced processing techniques can be specified in a video compression standard. Typically, the design of a compliant video encoder is not specified in the standard. Optimization of the communication system's requirements is dependent on the design of the video encoder. An important aspect of the encoder design is advantageous utilization of available encoding techniques.

Video encoding standards may utilize a combination of encoding techniques such as intra-coding and inter-coding. Intra-coding uses spatial prediction based on information that is contained in the picture itself. Inter-coding uses motion estimation and motion compensation based on previously encoded pictures.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for intra spatial prediction while encoding video data, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method for high-speed, programmable spatial prediction in a video encoder are presented. The system can be dynamically programmed with the desired prediction modes and edge sample terms before processing begins. Additionally, the prediction modes can be optimized, compiled and loaded into the system to provide for better spatial prediction results. For example, the H.264 spatial prediction modes and coefficients may be loaded into the system.

This system and method provide a loadable micro coded engine yielding a flexible and programmable spatial predictor. Therefore, an improvement is provided over other approaches that may be fixed and not able to be changed without conventional logic modifications and refabrication.

By taking advantage of redundancies in video data, video encoders can reduce the bit rate while maintaining the perceptual quality of the picture. The reduced bit rate will save memory in applications that require storage such as DVD recording, and will save bandwidth for applications that require transmission such as HDTV broadcasting. Bits can be saved in video encoding by reducing space and time redundancies. Time redundancies are reduced when a portion of one picture can predict a portion of another picture.

Spatial redundancies are reduced when one portion of a picture can be predicted by another portion of the same picture. Spatial prediction for image compression may involve predicting sample data from previously decoded neighboring samples. The prediction for each sample in a block may require a unique combination of edge samples for several directional prediction modes. These predictions must occur at a rate that is high enough to keep up with a real-time video stream.

Figure 1:
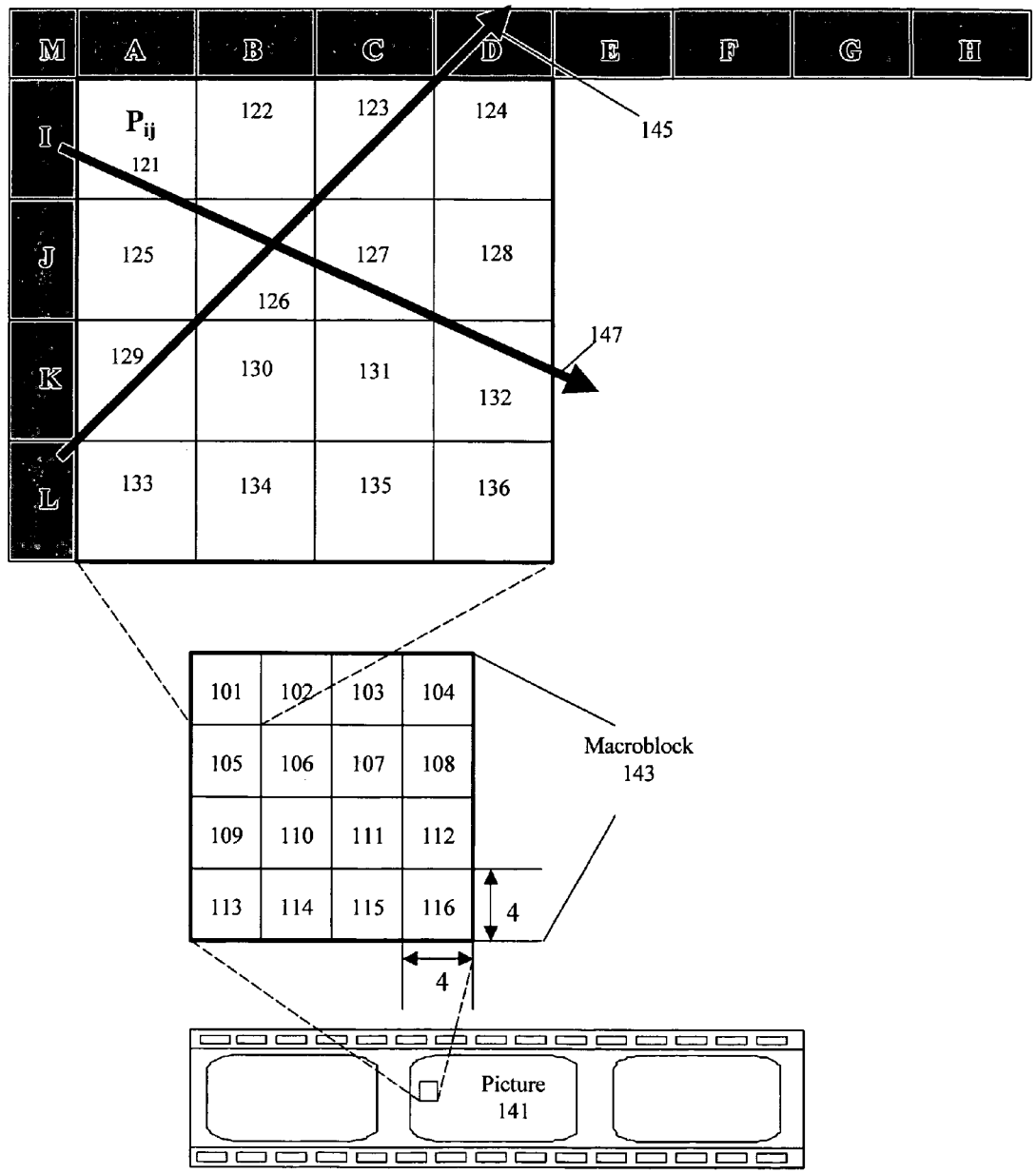
FIG. 1 is a block diagram describing spatial prediction of a macroblock in a picture in accordance with an embodiment of the present invention.

FIG. 1 is a block diagram 100 describing a spatially encoded macroblock 143 of a picture 141 in accordance with an embodiment of the present invention.

Spatial prediction computes samples based on a carefully weighted average of neighboring samples. The computation is divided into 4×4 partitions 101-116 of samples. There are 16 of these partitions 101-116 per macroblock 123. Each macroblock is 16×16 (256) samples. All 256 samples are predicted by a spatial prediction 16 samples 121-136 at a time.

Each 4×4 partition 101-116 is processed using the edge samples A-M of adjacent partitions.

The arrows 145 and 147 indicate the directional mode for the predictions. As the direction of the prediction mode changes, the sample weights change. There are 9 directional modes to compute for each sample 121-136 in each 4×4 partition 101-116. If the edge samples for a mode are not available, the mode is not valid and is not computed.

Figure 2:
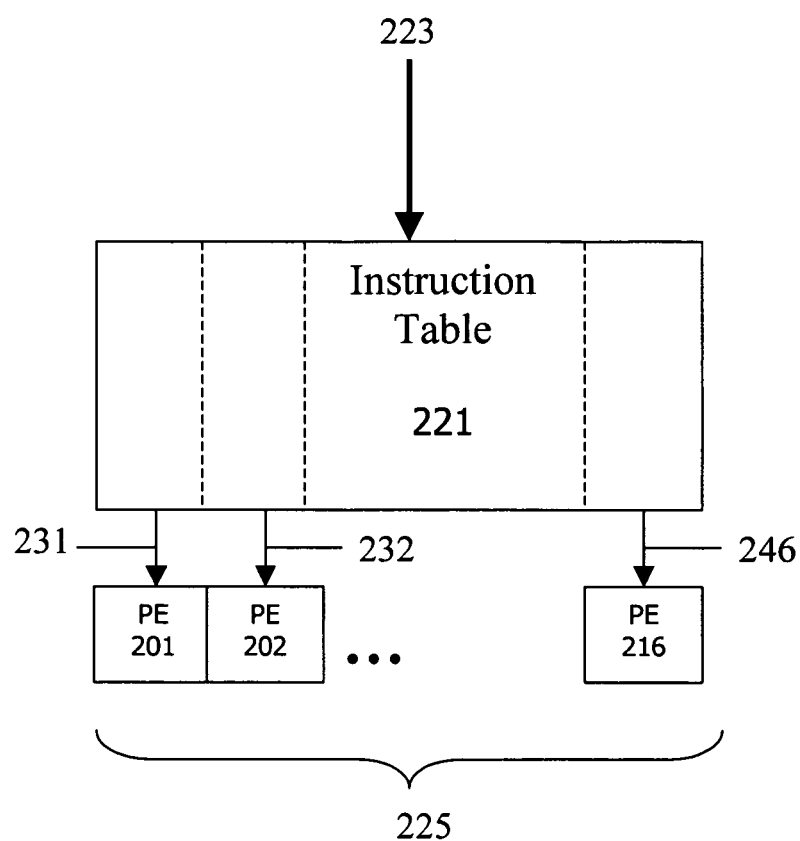
FIG. 2 is a block diagram of an exemplary system for spatial prediction in accordance with an embodiment of the present invention.

FIG. 2 is a block diagram of an exemplary system 200 for spatial prediction in accordance with an embodiment of the present invention. A loadable instruction table 221 holds the instructions 231, 232, and 246 for each processing element (PE) 201, 202, and 216 in the array of PEs 225. The instructions may be stored in the memory of an integrated circuit. An engine for execution of the instructions may also be a circuit in the integrated circuit. There are 16 PEs, one for each sample in the 4×4 subblock. Each PE executes the following algorithm to compute the predicted sample values:

$$P_{ij} = (A_{ij}X_{ij} + B_{ij}C_{ij}Z_{ij} + \ldots + r_{ij})/w_{ij}$$

where i, j=0 . . . 3
A, B, C are neighboring samples
X, Y, Z are sample weights
r is the rounding value
w is the scaling amount Up to 6 neighboring edge samples can be used for each prediction. All samples weights, rounding and scaling values can be powers of 2 to simplify the math.

The instructions 231, 232, and 246 for each PE 201, 202, and 216 can be output simultaneously so the predictions for each sample are computed in parallel. Each prediction mode may require j+2 clocks to compute 16 samples where j equals the maximum number of weighted samples involved.

The address 221 for the instruction table can be formed with {mode, step} where step is the instruction step within a mode and mode is the prediction mode.

The instruction can contain an opcode and operands. Opcodes may be 'round', 'accum' and 'scale'. The 'round' operand is the round value. The 'accum' operands are the neighbor sample and the weight. The 'scale' operand is the scale value.

An example instruction for each sample may be the following:

```
; ------- mode 0 -------
round           PLUS4,
accum           A, X1,
accum           B, X2,
accum           C, X4,
accum           D, X4,
accum           Z, X1,
accum           Z, X1,
scale           DIV8,
...
; ------- mode 8 -------
round           PLUS2,
accum           I, X1,
accum           J, X2,
accum           K, X4,
accum           L, X1,
accum           Z, X1,
accum           Z, X1,
scale           DIV4,
```

In this particular example above, the mode 0 prediction is $$P=(A+2B+4C+4D+0+0+4)/8$$

and the mode 8 prediction is $$P=(1+2J+4K+L+0+0+2)/4$$

Figure 3:
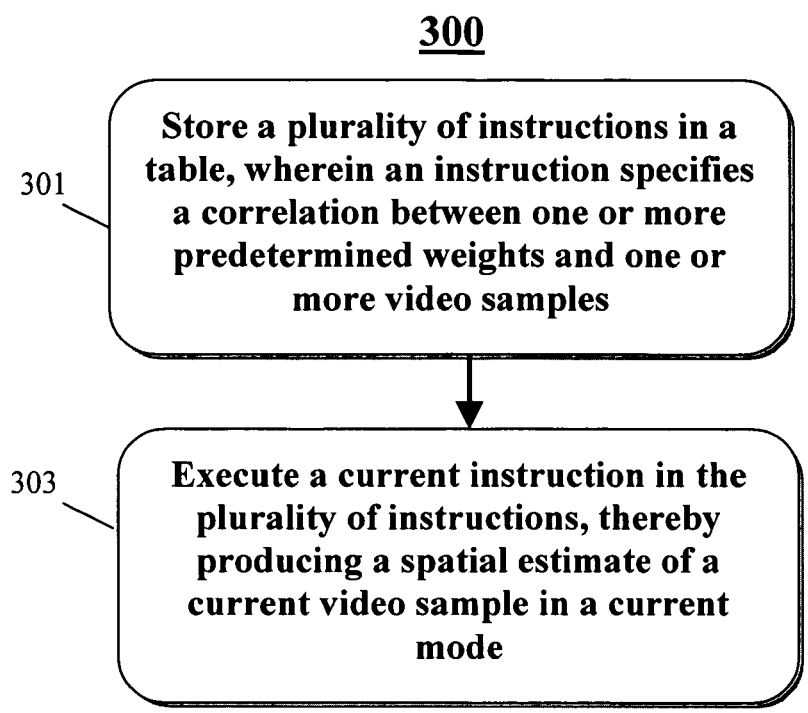
FIG. 3 is a flow diagram 300 of an exemplary method for spatial prediction in accordance with an embodiment of the present invention.

Any combination of neighbor samples and weights are possible. Once the equations are created for the modes, the microcode source is assembled into object code and can be loaded into the instruction table for execution FIG. 3 is a flow diagram 300 of an exemplary method for spatial prediction in accordance with an embodiment of the present invention.

At 301, store a plurality of instructions in a table, wherein an instruction performs a correlation between one or more predetermined weights and one or more video samples. In H.264, there are 9 modes that are specified. Each mode has a different weighted combination of neighboring samples. For fixed-point implementation, a bias term may be added for rounding. For example, one half may be added to cause rounding when an operation would otherwise truncate any fraction less than 1.

At 303, execute a current instruction, thereby producing a spatial estimate of a current video sample in a current mode. The current instruction may be selected according to the current mode and a relative position of the current video sample. Instructions may be selected in parallel to enable a simultaneous generation of outputs. For example, a macroblock may be divided into 4×4 partitions. Accordingly, 16 instructions may be executed simultaneously to produce an output array of 4×4 samples. Each element of the output array corresponds to one of the 16 video samples in a 4×4 subblock.

When spatial estimates for a macroblock are complete, the quality of available prediction modes can be determined by computing the SATD for the macroblock. Then, the best mode is selected based on the lowest SATD cost.

This invention can be applied to video data encoded with a wide variety of standards, one of which is H.264. An overview of H.264 will now be given.

H.264 Video Coding Standard

The ITU-T Video Coding Experts Group (VCEG) and the ISO/IEC Moving Picture Experts Group (MPEG) drafted a video coding standard titled ITU-T Recommendation H.264 and ISO/IEC MPEG-4 Advanced Video Coding, which is incorporated herein by reference for all purposes. In the H.264 standard, video is encoded on a macroblock-by-macroblock basis. The generic term "picture" refers to frames and fields.

The specific algorithms used for video encoding and compression form a video-coding layer (VCL), and the protocol for transmitting the VCL is called the Network Access Layer (NAL). The H.264 standard allows a clean interface between the signal processing technology of the VCL and the transport-oriented mechanisms of the NAL, so source-based encoding is unnecessary in networks that may employ multiple standards.

By using the H.264 compression standard, video can be compressed while preserving image quality through a combination of spatial, temporal, and spectral compression techniques. To achieve a given Quality of Service (QoS) within a small data bandwidth, video compression systems exploit the redundancies in video sources to de-correlate spatial, temporal, and spectral sample dependencies. Statistical redundancies that remain embedded in the video stream are distinguished through higher order correlations via entropy coders. Advanced entropy coders can take advantage of context modeling to adapt to changes in the source and achieve better compaction.

An H.264 encoder can generate three types of coded pictures: Intra-coded (I), Predictive (P), and Bidirectional (B) pictures. Each macroblock in an I picture is encoded independently of other pictures based on a transformation, quantization, and entropy coding. I pictures are referenced during the encoding of other picture types and are coded with the least amount of compression. Each macroblock in a P picture includes motion compensation with respect to another picture. Each macroblock in a B picture is interpolated and uses two reference pictures. The picture type I uses the exploitation of spatial redundancies while types P and B use exploitations of both spatial and temporal redundancies. Typically, I pictures require more bits than P pictures, and P pictures require more bits than B pictures.

Figure 4:
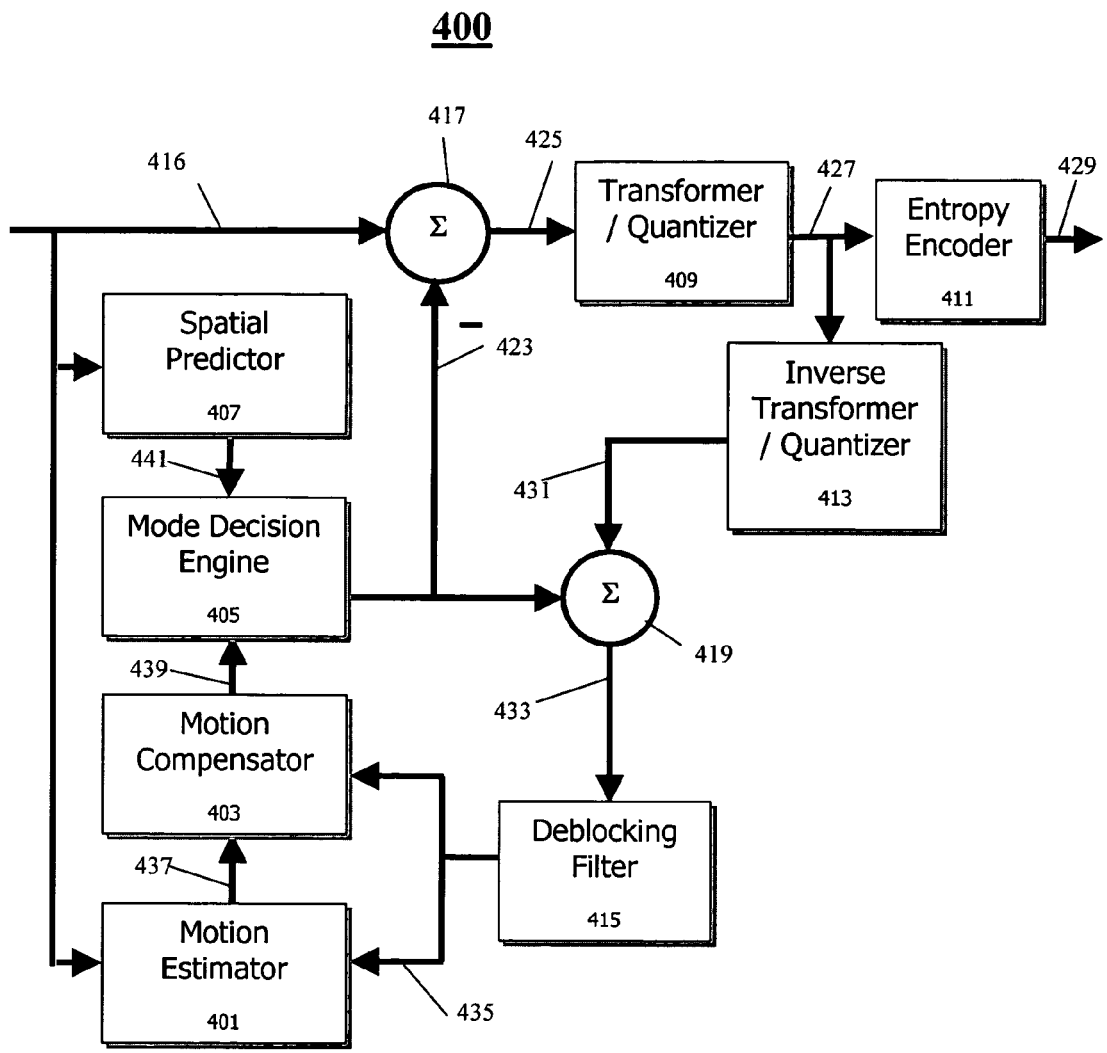
FIG. 4 is a block diagram of an exemplary video encoding system in accordance with an embodiment of the present invention.

Referring now to FIG. 4, there is illustrated a block diagram of an exemplary video encoder 400. The video encoder 400 comprises a motion estimator 401, a motion compensator 403, a mode decision engine 405, a spatial predictor 407, a transformer/quantizer 409, an entropy encoder 411, an inverse transformer/quantizer 413, and a deblocking filter 415.

The spatial predictor 407 uses only the contents of a current picture 416 for prediction. The spatial predictor 407 receives the current picture 416 and can produce a spatial prediction 441. As described in more detail with reference to FIG. 2, macroblocks can be divided into 4×4 partitions, and each partition may have up to 9 possible prediction modes.

The motion estimator 401 predicts the partitions in the current picture 416 from reference prediction blocks in previously encoded pictures 435. The motion estimator 401 searches partitions of variable size. Each partition of a macroblock is compared to one or more reference prediction blocks in previously encoded pictures 435 that may be temporally located before or after the current picture 416. The motion compensator 403 receives the motion vectors 437 and generates a temporal prediction 439.

The mode decision engine 405 will receive the spatial prediction 441 and temporal prediction 439 and select the prediction mode according to a sum of absolute transformed difference (SATD) cost that optimizes rate and distortion. A selected prediction 423 is output.

Once the mode is selected, a corresponding prediction error 425 is the difference 417 between the current picture 421 and the selected prediction 423. The transformer/quantizer 409 transforms the prediction error and produces quantized transform coefficients 427. In H.264, there are 52 quantization parameters.

The prediction error is transformed by means of a low-complexity 4×4 matrix that together with an appropriate scaling in the quantization stage approximates the 4×4 Discrete Cosine Transform (DCT). The Transform is applied in both horizontal and vertical directions. When a macroblock is encoded as intra 16×16, the DC coefficients of all 16 4×4 blocks are further transformed with a 4×4 Hardamard Transform.

H.264 specifies two types of entropy coding: Context-based Adaptive Binary Arithmetic Coding (CABAC) and Context-based Adaptive Variable-Length Coding (CAVLC). The entropy encoder 411 receives the quantized transform coefficients 427 and produces a video output 429. In the case of temporal prediction, a set of picture reference indices may be entropy encoded as well.

The quantized transform coefficients 427 are also fed into an inverse transformer/quantizer 413 to produce a regenerated error 431. The original prediction 423 and the regenerated error 431 are summed 419 to regenerate a reference picture 433 that is passed through the deblocking filter 415 and used for motion estimation.

The embodiments described herein may be implemented as a board level product, as a single chip, application specific integrated circuit (ASIC), or with varying levels of a video classification circuit integrated with other portions of the system as separate components. An integrated circuit may store a supplemental unit in memory and use an arithmetic logic to encode, detect, and format the video output.

The degree of integration of the rate control circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on one encoding standard, the invention can be applied to a wide variety of standards.

Therefore, it is intended that the present invention not be limited to the particular embodiment disclosed, but that the present invention will include all embodiments falling within the scope of the appended claims.

The invention claimed is:

1. A method for spatial prediction in a video encoder, said method comprising:
   storing a plurality of instructions in a table, wherein an instruction performs a correlation between one or more predetermined weights and one or more video samples; and
   executing a current instruction with a controller, thereby producing a spatial estimate of a current video sample in a current mode.

2. The method of claim 1, wherein the table contains instructions for 9 spatial estimation modes.

3. The method of claim 1, wherein the current mode is evaluated based on a sum of absolute difference.

4. The method of claim 1, wherein the table contains instructions for 16 video sample positions.

5. The method of claim 1, wherein the current instruction is selected according to the current mode and a relative position of the current video sample.

6. The method of claim 1, wherein more than one instruction is selected at one time.

7. The method of claim 5, wherein 16 instructions are selected at one time.

8. A system for spatial prediction in a video encoder, said system comprising:
   an instruction table storing a plurality of instructions, wherein an instruction performs a correlation between one or more predetermined weights and one or more video samples; and
   an engine for executing a current instruction, thereby producing a spatial estimate of a current video sample in a current mode.

9. The system of claim 8, wherein the table contains instructions for 9 spatial estimation modes.

10. The system of claim 8, wherein the system further comprises:
    a mode decision engine for evaluating the current mode based on a sum of absolute difference.

11. The system of claim 8, wherein the table contains instructions for 16 video sample positions.

12. The system of claim 8, wherein the engine further selects the current instruction according to the current mode and a relative position of the current video sample.

13. The system of claim 8, wherein the engine executes more than one instruction at one time.

14. A system for spatial prediction in a video encoder, said system comprising:
    an integrated circuit comprising:
    a memory storing a plurality of instructions, wherein an instruction performs a correlation between one or more predetermined weights and one or more video samples; and
    a first circuit for executing a current instruction, thereby producing a spatial estimate of a current video sample in a current mode.

15. The system of claim 14, wherein the memory contains instructions for 9 spatial estimation modes.

16. The system of claim 14, wherein the system further comprises:
    a second circuit for evaluating the current mode based on a sum of absolute difference.

17. The system of claim 14, wherein the memory contains instructions for 16 video sample positions.

18. The system of claim 14, wherein the system further comprises:
- a third circuit for selecting the current instruction according to the current mode and a relative position of the current video sample.

19. The system of claim 14, wherein the first circuit executes more than one instruction at one time.

20. The system of claim 14, wherein the first circuit executes 16 instructions in parallel.

* * * * *